United States Patent
Gunnewig et al.

(10) Patent No.: US 9,264,233 B2
(45) Date of Patent: Feb. 16, 2016

(54) SYSTEM AND METHOD FOR A LOG-IN PROCEDURE FOR NON-READERS

(75) Inventors: Susan Evelyn Gunnewig, Spring, TX (US); Robin Virginia Norton, Winston-Salem, NC (US); Matthew Thomas Nolan, Kernersville, NC (US)

(73) Assignee: Hatch, Inc., Winston-Salem, NC (US)

( * ) Notice: Subject to any disclaimer, the term of this patent is extended or adjusted under 35 U.S.C. 154(b) by 725 days.

(21) Appl. No.: 13/169,579

(22) Filed: Jun. 27, 2011

(65) Prior Publication Data

US 2012/0331549 A1    Dec. 27, 2012

(51) Int. Cl.
*G06F 21/36* (2013.01)
*H04L 9/32* (2006.01)

(52) U.S. Cl.
CPC .............. *H04L 9/3226* (2013.01); *G06F 21/36* (2013.01)

(58) Field of Classification Search
CPC ..... G06F 3/01; G06F 3/0481; G06F 3/04842; G06F 3/04845; G06F 3/04846; G06Q 50/205; H04N 21/431; H04N 21/44222
USPC .......................................................... 726/19
See application file for complete search history.

(56) References Cited

U.S. PATENT DOCUMENTS

| | | | |
|---|---|---|---|
| 7,117,173 B1* | 10/2006 | Ambani | 705/35 |
| 8,024,775 B2 | 9/2011 | Xu et al. | |
| 2004/0093527 A1* | 5/2004 | Pering et al. | 713/202 |
| 2005/0071637 A1* | 3/2005 | Shirakawa | 713/170 |
| 2007/0024698 A1* | 2/2007 | Engstrom et al. | 348/14.01 |
| 2007/0229465 A1* | 10/2007 | Sakai et al. | 345/173 |
| 2008/0307339 A1* | 12/2008 | Boro et al. | 715/764 |
| 2012/0044061 A1* | 2/2012 | Sakai et al. | 340/12.5 |
| 2013/0227675 A1* | 8/2013 | Fujioka | G06F 21/30 726/16 |

* cited by examiner

*Primary Examiner* — Tamara T Kyle
(74) *Attorney, Agent, or Firm* — Quarles & Brady LLP (57) ABSTRACT

A system and method for logging a non-reader into a corresponding user account is disclosed. A system can include a processor, a user interface, a display, and a camera. The processor can be programmed to display a first plurality of pictures and configure the user interface to allow the user to select a first picture corresponding to the user from the first plurality of pictures to provide a first authentication step and allow the user to select a second picture from a second plurality of pictures providing a second authentication step. The system can log the user into the corresponding user account if the second picture selected from the second authentication step corresponds to the first picture selected from the first authentication step. A system and method for logging multiple users into corresponding user accounts is also disclosed.

21 Claims, 8 Drawing Sheets

SYSTEM AND METHOD FOR A LOG-IN PROCEDURE FOR NON-READERS

CROSS REFERENCE TO RELATED APPLICATIONS

Not applicable.

STATEMENT OF FEDERALLY SPONSORED RESEARCH OR DEVELOPMENT

Not applicable.

FIELD OF THE INVENTION

The present invention relates to computerized systems and methods for providing selective access to computer applications, and more particularly to computerized systems and methods for providing access to computer applications by non-readers.

BACKGROUND

Technology is playing an ever increasing role in students' education. Not only are almost all of today's young students exposed to computers at home, but many classrooms incorporate personal computers that can execute applications to teach lessons and skill sets. Just as with any other form of education, a student's progress must be tracked and evaluated periodically to best serve the student's educational plan. However, due to the expense of such technology, many classroom environments only incorporate one computer that all the students of the class share. It therefore becomes important to be able to monitor which student is executing the applications in order to track each student's progress on an individual basis.

Personal computers used in classroom environments therefore frequently employ a log-in system. These log-in systems often assign a unique password to each student, so each student can access their own personal user account such that their progress can be monitored and tracked during computer use. However, non-readers may have difficulty remembering and typing a password to log themselves into the computer because they may not be proficient with the alphabet or even recognize letters of the alphabet. In addition, relying on the teacher or instructor to log each student into the system before the student can be associated with their unique user account can be time consuming for the teacher, occupying time that could be spent instructing other students in the classroom.

The present invention addresses these problems and other issues.

SUMMARY OF THE INVENTION

In one aspect, the disclosed invention provides a method and system for logging a user into a corresponding user account by employing a unique picture that is associated with the user.

In one form, the invention can provide a system for logging a user into a corresponding user account from a plurality of user accounts. This user can be one member of a group. The system can include a processor, a user interface, and a display. The user interface and the display are in communication with the processor. The processor can be programmed to display a first plurality of pictures including a picture of each member of the group. The processor can configure the user interface to allow the user to select a first picture corresponding to the user from the first plurality of pictures to provide a first authentication step. A second plurality of pictures can be displayed by the processor and can include the picture corresponding to the user. The user interface can allow the user to select a second picture from the second plurality of pictures to provide a second authentication step. The system can log the user into the corresponding user account if the second picture selected from the second authentication step corresponds to the first picture selected from the first authentication step.

In another aspect, the invention provides a system for logging a user into a corresponding user account from a plurality of user accounts, the user being one member of a group of non-readers. The system can include a processor and a memory storage device in communication with the processor. The memory storage device can store a database that includes the plurality of user accounts, each user account of the plurality of user accounts including personal identification data corresponding to one member of the group of non-readers. The system can include a camera in communication with the processor, which is configured to acquire a picture of each user. The processor can be configured to store each picture of each user with the corresponding user account in the database. The system can also include a user interface and a display that are in communication with the processor. The processor can be programmed to retrieve a first plurality of pictures from the database and display the first plurality of pictures. The first plurality of pictures can include a picture of each member of the group of non-readers. The processor can prompt the user to select a first picture from the first plurality of pictures corresponding to the user by providing a first audible instruction to the user from an animated figure. The processor can configure the user interface to allow the user to select the first picture corresponding to the user from the first plurality of pictures to provide a first authentication step. A second plurality of pictures can be displayed. The second plurality of pictures can include the first picture corresponding to the user, the user interface allowing the user to select a second picture from the second plurality of pictures to provide a second authentication step. The system can log the user into the corresponding user account if the second picture selected from the second authentication step corresponds to the first picture selected from the first authentication step.

In yet another form, the invention provides a method for logging a user into a corresponding user account on at least one of a computer and mobile device. The user can be one member of a group. The method can include the step of displaying a first plurality of pictures on a display. The first plurality of pictures can include a picture of each member of the group. The method can include the step of providing a user interface to allow the user to select a first picture corresponding to the user from the first plurality of pictures to provide a first authentication step. The method can further include displaying a second plurality of pictures including the picture corresponding to the user on the display. The user interface can allow the user to select a second picture from the second plurality of pictures to provide a second authentication step. The method can include the step of logging the user into the corresponding user account if the second picture selected from the second authentication step corresponds to the first picture selected from the first authentication step.

In still another aspect, the invention provides a system for logging multiple users into corresponding user accounts from a plurality of user accounts. The multiple users can include at least a first user and a second user that can be members of a group. The system can include a processor, a user interface in communication with the processor, and a display in communication with the processor. The display can include at least a first plane and a second plane, the first plane and second plane comprising separate windows on the display. The processor can be programmed to display a plurality of pictures, the plurality of pictures including a picture of each member of the group. The processor can also be programmed to receive input from the user interface to allow the first user to select a first picture corresponding to the first user from the plurality of pictures to provide a first authentication step for the first user and to allow the first user to drag the first picture selected from the plurality of pictures to the first plane of the display to provide a second authentication step for the first user. The processor can be further programmed to allow the second user to select a second picture corresponding to the second user from the plurality of pictures to provide a first authentication step for the second user and to allow the second user to drag the second picture selected from the plurality of pictures to the second plane of the display to provide a second authentication step for the second user. The processor can log the first user into the corresponding user account for the first user in the first plane after the first user drags the first picture into the first plane of the display in the second authentication step for the first user. The processor can log the second user into the corresponding user account for the second user in the second plane after the second user drags the second picture into the second plane of the display in the second authentication step for the second user.

In another form, the invention provides a method for logging multiple users into corresponding user accounts from a plurality of user accounts into at least one of a computer or a mobile device comprising a display with at least a first plane and a second plane. The first plane and the second plane can include separate windows on the display. The multiple users can include at least a first user and a second user that can be members of a group. The method can include the step of displaying a plurality of pictures, the plurality of pictures including a picture of each member of the group. The method can also include providing a user interface to allow the first user to select a first picture corresponding to the first user from the plurality of pictures to provide a first authentication step for the first user and to allow the first user to drag the first picture selected from the plurality of pictures to the first plane of the display to provide a second authentication step for the first user. The method can include allowing the second user to select a second picture corresponding the second user from the plurality of pictures to provide a first authentication step for the second user and to allow the second user to drag the second picture selected from the plurality of pictures to the second plane of the display to provide a second authentication step for the second user. The method can include the step of logging the first user into the corresponding user account for the first user in the first plane after the first user drags the first picture into the first plane of the display in the second authentication step for the first user. The method can also include the step of logging the second user into the corresponding user account for the second user in the second plane after the second user drags the second picture into the second plane of the display in the second authentication step for the second user.

The present invention allows a non-reader to log into their unique user account without having to remember and type a password. Non-readers, or even readers who are just developing their reading skills, may struggle to remember or type a password. By allowing non-readers to log into their corresponding user accounts by themselves, each user's progress may be tracked during execution of computer applications that provide instruction on specific lessons or skill sets. In addition, each user's user account may be individualized to allow access to specific computer applications based on a user's progress and development in certain areas of instruction. With the present invention, students can access their accounts without the intervention of the teacher or instructor. The teacher or instruct therefore can continue to work with other students while students are accessing their corresponding user accounts.

The present invention can be used not only by non-readers, but also by beginning readers, users with special education requirements, elderly individuals, and individuals that may have difficulty with computers or technology in general. In fact, the present invention may be applied in computing environments that benefit from a log in procedure to simplify a system and method for logging a user into their user account.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE PREFERRED EMBODIMENT

Figure 1A:
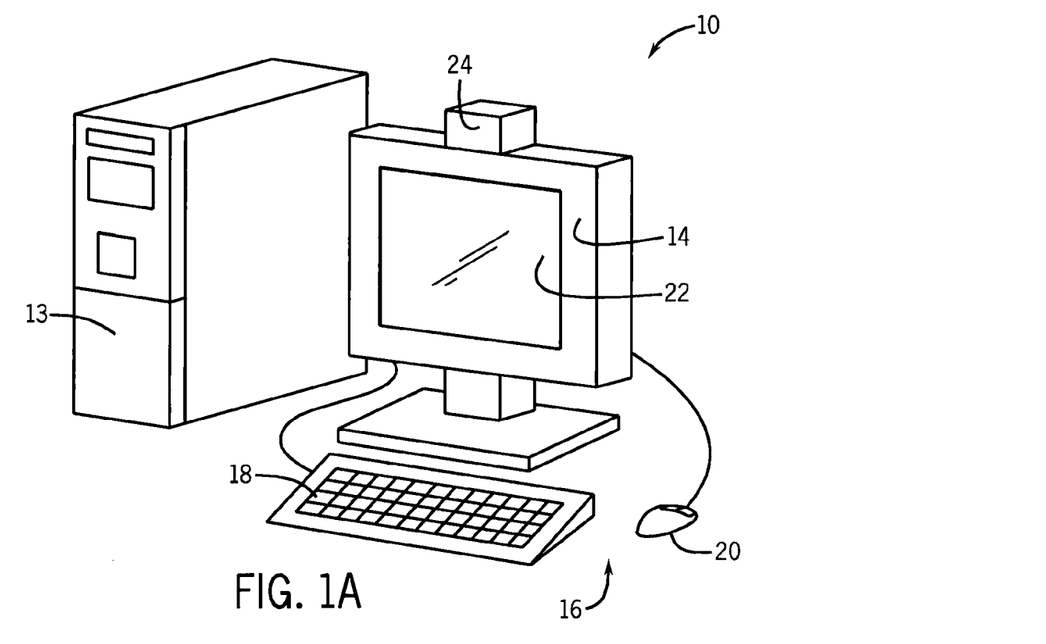
FIG. 1A is a perspective view of a computer system embodying the invention.
Figure 1B:
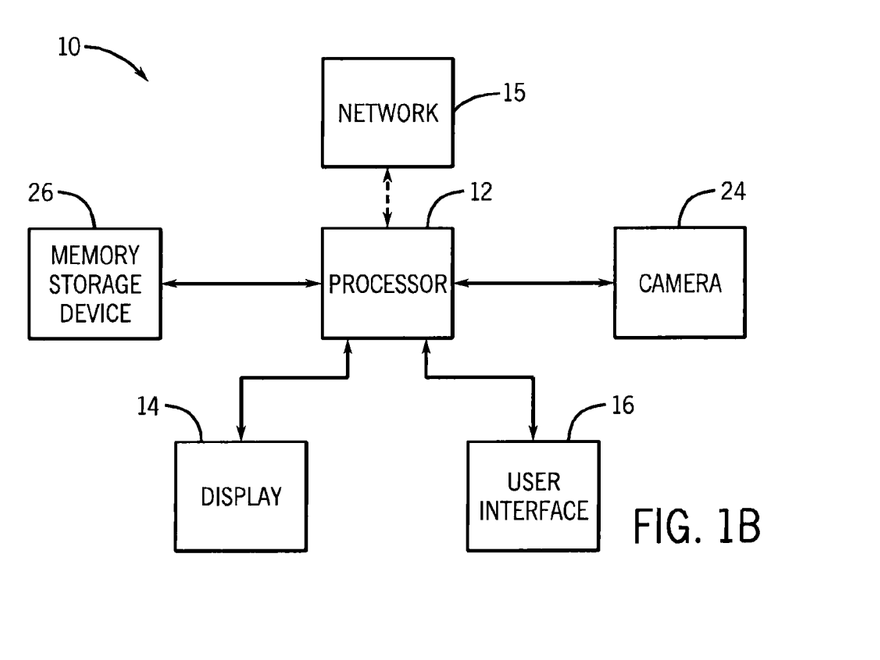
FIG. 1B is a diagram showing the connectivity of the system of FIG. 1A.

Referring to FIGS. 1A and 1B, a typical electronic system 10 that can be used in accordance with the present invention to log a user into a corresponding user account from a plurality of user accounts is shown. The system 10 includes a processing unit included or provided in a housing 13 including a processor 12 that is in electrical communication with a display 14. The system 10 also includes a user interface 16 that is in electrical communication with the processor 12. The term "user interface" as used herein is an interface between a human user and a computer that enables communication between a user and a computer. The user interface can include, but is not limited to, a keyboard 18, a mouse 20, a touch-screen 22 on the display 14, a joystick or other controller, a graphical user interface, a trackball, a microphone (used in conjunction with a voice recognition system), a speaker, a display screen, or any combinations thereof.

A memory storage device 26 may be included in the housing 13. Alternatively, a memory storage device 26 may form part of the system 10, but be remotely connected to the system 10 through a network connection such as a VIN, VPN, ethernet wireless, or mobile connection network such as a 3G or other network. The processor 12 can also be connected to a network 15 that can include its own processor and memory storage devices. The memory storage device 26 of the system 10 can form part of the network 15.

The processor 12, display 14, user interface 16, and housing 13 of the system 10 can form part of a single personal computer, such as those based on Intel PENTIUM-type processor, Motorola PowerPC, Sun UltraSPARC, Hewlett-Packard PA-RISC processors, or any other type of processor, or form one or more components of separate, discrete systems. Further, each component may be distributed across multiple systems, and one or more of the systems can be interconnected. The processor 12, display 14, user interface 16, and housing 13 can also form part of a mobile device, including, but not limited to: a mobile computer, a tablet personal computer, a personal digital assistant, or a mobile telephone, such as a Smartphone.

The system 10 can also include a camera 24 that is in electrical communication with the processor 12. The camera 24 can be installed on or integral with the display 14, however, a separate camera 24 may be used with the system 10 as long as the camera 24 can be in electrical communication with the processor 12 or acquired images or pictures can be downloaded from the camera 24 to the processor 12. The camera 24 can be used to acquire a picture of each user and the processor 12 is programmed to store each picture of each user with their corresponding user account in a database.

The database of user accounts can be stored on the memory storage device 26 and can include personal identification information of the corresponding user. This information may be entered by an administrator or teacher that is privy to this personal information. The user accounts also may be configured to store data that is attributed to inputs from the user while the user executes one or more applications while being logged into their corresponding user account on the system 10. By way of example, the system 10 can employ applications such as Shell Squad Games that are a part of the iStartSmart™ Learning Center manufactured by Hatch, 301 North Main Street, Winston-Salem, N.C. 27101, U.S.A., and can track user responses to input data.

Figure 2A:
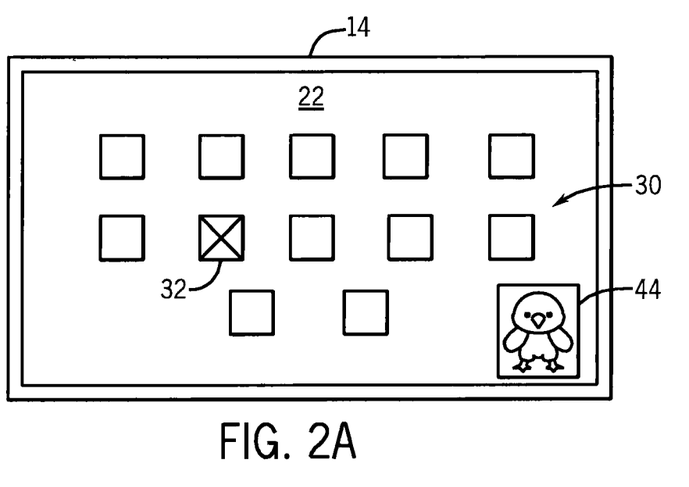
FIG. 2A is a front view of a display of the system of FIG. 1A showing a first plurality of pictures.
Figure 2B:
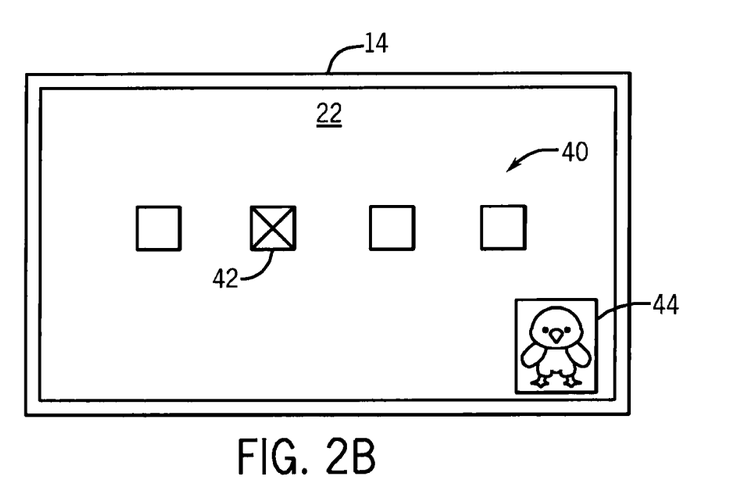
FIG. 2B is a front view of a display of the system of FIG. 1A showing a second plurality of pictures.
Figure 3:
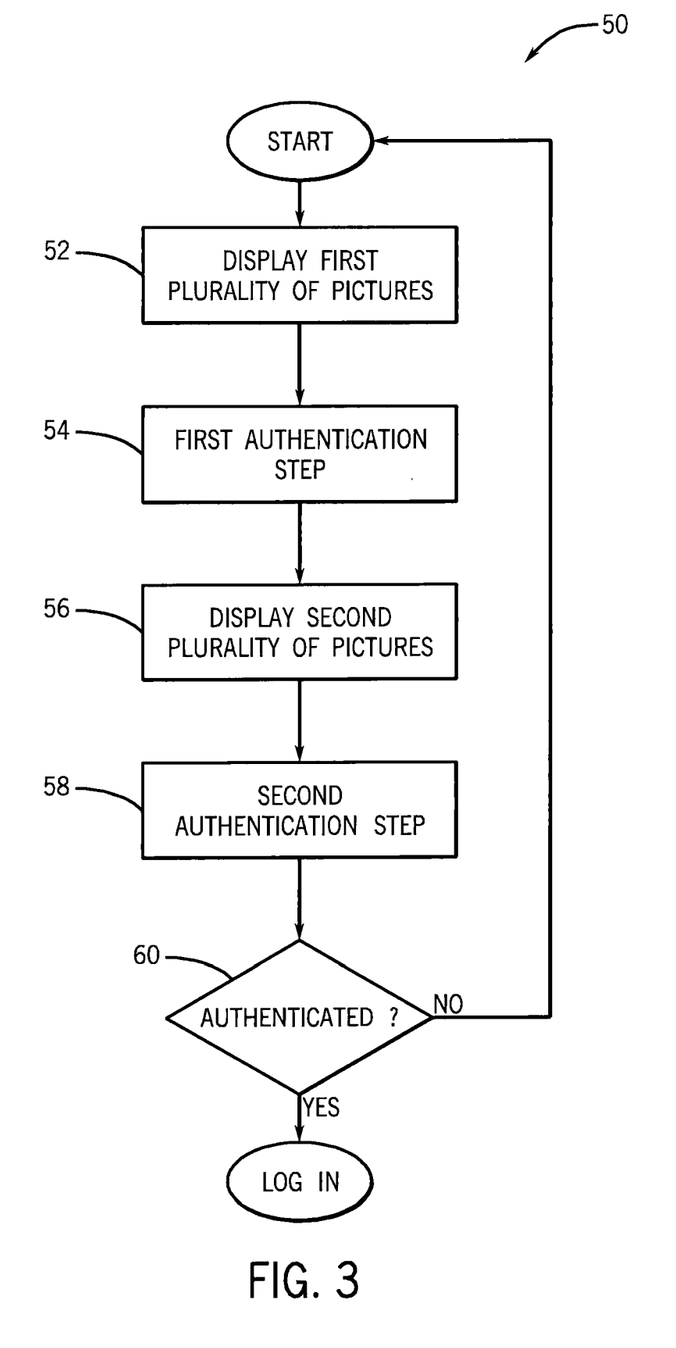
FIG. 3 is a flowchart showing a method for logging a user into their corresponding user account.

Referring now to FIGS. 2A, 2B, and 3, after a student, or user, activates the system 10 to start the method 50, the system 10 retrieves a first plurality of pictures 30 from the database in memory storage device 26 and displays the first plurality of pictures 30 on the display 14 (step 52) as shown in FIG. 2A. The first plurality of pictures 30 may include a picture of each user of a group, such as a class. The student may then select a first picture 32 that corresponds to himself or herself in a first authentication step 54. For example, picture 32 in the first plurality of pictures 30 in FIG. 2A is denoted with an "X." The user may select the picture 32 in this first authentication step 54 through the user interface 16 by using, for example, the keyboard 18, the mouse 20, a controller, or preferably, by touching the touch-screen 22 on the display 14. Even a non-reader can perform this first authentication step 54 of selecting the picture 32 that corresponds to himself or herself.

After selecting the first picture 32 that corresponds to the user in the first authentication step 54, the system 10 is programmed to retrieve a second plurality of pictures 40 and display the second plurality of pictures 40 on the display 14 as shown in FIG. 2B in step 56. The second plurality of pictures 40 includes the first picture 32 that the user selected in the first authentication step 54. The second plurality of pictures 40 can include a total number of pictures that is less than the first plurality of pictures 30, and can include, by way of example, four pictures. The processor 12 can also be programmed to randomize the order of the first picture 32 in the second plurality of pictures 40 between each successive log-in for the user. In performing the second authentication step 58, the user selects a second picture 42. The user can select the second picture 42 in the same fashion that the user selects the first picture 32 in the first authentication step 54, as described above.

Referring still to FIG. 3, the processor 12 is programmed to perform an authentication verification step 60 before allowing the user to access applications on the system 10. If the picture 32 selected from the first plurality of pictures 30 in the first authentication step 54 corresponds to the picture 42 selected from the second plurality of pictures 40 in the second authentication step 58, then the system 10 logs the user into their corresponding user account. As shown in the flowchart in FIG. 3, if the picture 32 selected from the first plurality of pictures 30 in the first authentication step 54 does not correspond to the second picture 42 selected from the second plurality of pictures 40 in the second authentication step 58, then the authentication verification 60 fails and the system 10 directs the user back to the start of the log-in method 50.

Once the user is logged into their corresponding user account, the user may execute one or more applications, such as those found in the Shell Squad Games package described above. Because the user is logged into their corresponding user account, the system 10 may compile data of the user's progress as the user executes applications. The system 10 can save that data to the corresponding user account on the memory storage device 26. This allows an administrator, such as the teacher of the class, to access the plurality of user accounts on the memory storage device 26 to view a variety of information saved to each account including, but not limited to: the time each user spent on a certain application, each students' progress on one or more applications, each students' progress on a certain skill set, the class' progress on one or more applications, the class' progress on a certain skill set.

The log-in system 10 and method 50 allow the teacher to measure each students' progress, as well as the progress of the class as a whole, by providing the students with the capability to log into their corresponding user account so the data accumulated during execution of applications may be attributed to the appropriate student. In addition, the system 10 and method 50 allow students to log into their corresponding user accounts without assistance from the teacher, thus not distracting the teacher from other duties.

Other features of the system 10 may also be employed to further assist the user to log into their corresponding user account on the system 10. For example, as shown in FIGS. 2A and 2B, an animated figure 44 can appear on the screen 22 of the display while the first plurality of pictures 32 are being displayed in step 52 and while the second plurality of pictures 40 are being displayed in step 56. The animated figure 44 may provide an audible instruction to assist the user to log in to their corresponding user account, including, but not limited to: "Pick your picture to play a game." This animated figure 44 and audible instruction can assist the user to select their corresponding picture to complete both the first authentication step 52 and the second authentication step 58, or can be displayed to assist the user in just one of the steps 52, 58.

The system 10 may also contain other features to help verify that the user is logged into the corresponding user account. One such feature is that throughout the student's use of the system 10 when the student is logged into a user account, the picture 32, 42 the student selected in both the first authentication step 54 and the second authentication step 58 is displayed on the screen 22 of the display 14 (because the picture 32, 42 selected in these steps is the same in order to log the student into their corresponding user account, only a single picture of the student appears on the screen 22). This feature allows the teacher, or other authority figure, to verify that the student using the system 10 matches the picture shown on the display 14 that corresponds to that student's user account. If the student accidentally logged into the system 10 through another student's user account, the teacher may identify the problem, and instruct the student to log off the system 10 and log back in under the appropriate user account.

FIGS. 4A, 4B, and 5A-5C display a system 110 for logging multiple users, such as a first user and a second user, into corresponding user accounts, and for allowing more than one student to simultaneously access executable programs. The first user and second user can be members of a group, such as a class of students. Such a system 110 can be beneficial for teaching students to work together, yet still record and evaluate each students' progress through their corresponding user account during the execution of applications.

Figure 4A:
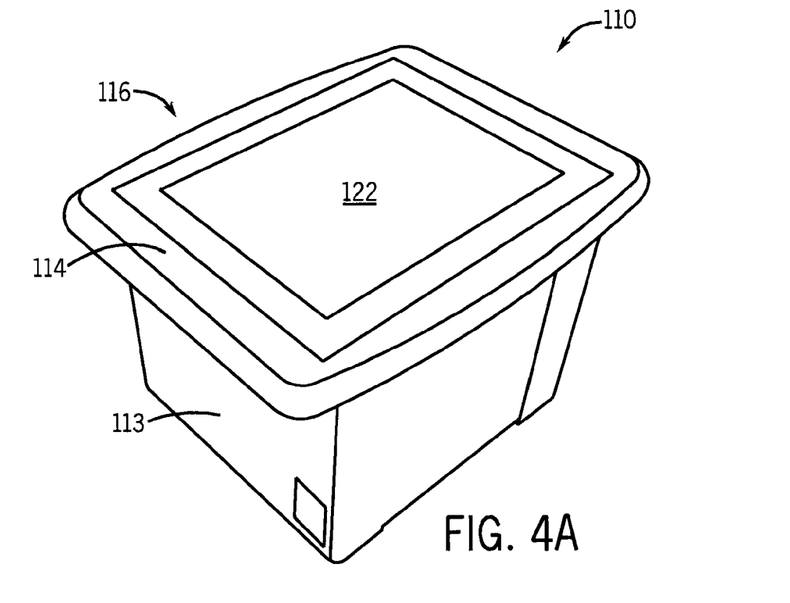
FIG. 4A is a perspective view of another embodiment of a system according to the invention.
Figure 4B:
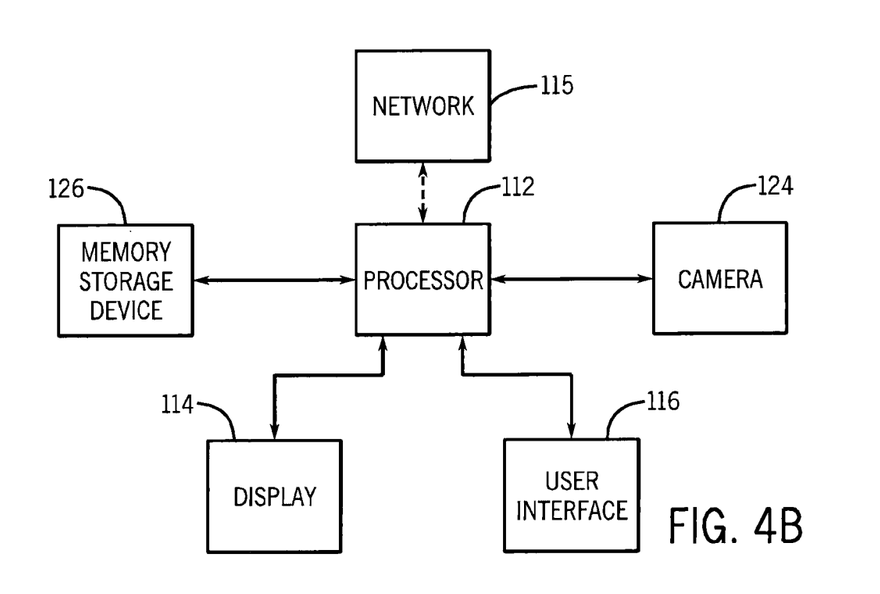
FIG. 4B is a diagram showing the connectivity of the system of FIG. 4A.

Referring to FIGS. 4A and 4B, the system 110 can include a processor 112 and a display 114 and a user interface 116 in electrical communication with the processor. The system can also include a memory storage device 126. As described in FIGS. 1A and 1B for system 10, the processor 112 and the memory storage device 126 can be provided within a housing 113 for system 110. The memory storage device 126 may be remotely connected to the processor 112 as described above with respect to system 10. The system 110 can also be connected to a network 115 that can include a processor and a memory storage device as well. In the embodiment shown in FIGS. 4 and 5A-5C, the user interface 116 includes a touch screen 122 on the display 114, although other types of user interfaces 116 can be used in conjunction with the system 110. By way of example, a SMART Table, manufactured by SMART Technologies, 3636 Research Road NW, Calgary, AB T2L 1Y1, Canada, can be used as part of the system 110.

A camera 124 can also form part of the system 110 and be in electrical communication with the system 110. As described above with respect to the system 10, the camera 124 can be used to acquire a picture of each user of the group, and the processor 112 can programmed to store each picture of each user with their corresponding user account in a database. The database of user accounts can be stored on a memory storage device 126 that can include personal identification information of the corresponding user. As described above, the user accounts can be configured to associate with data attributed to the user while the user executes one or more applications while being logged into their corresponding user account on the system 110.

Figure 5A:
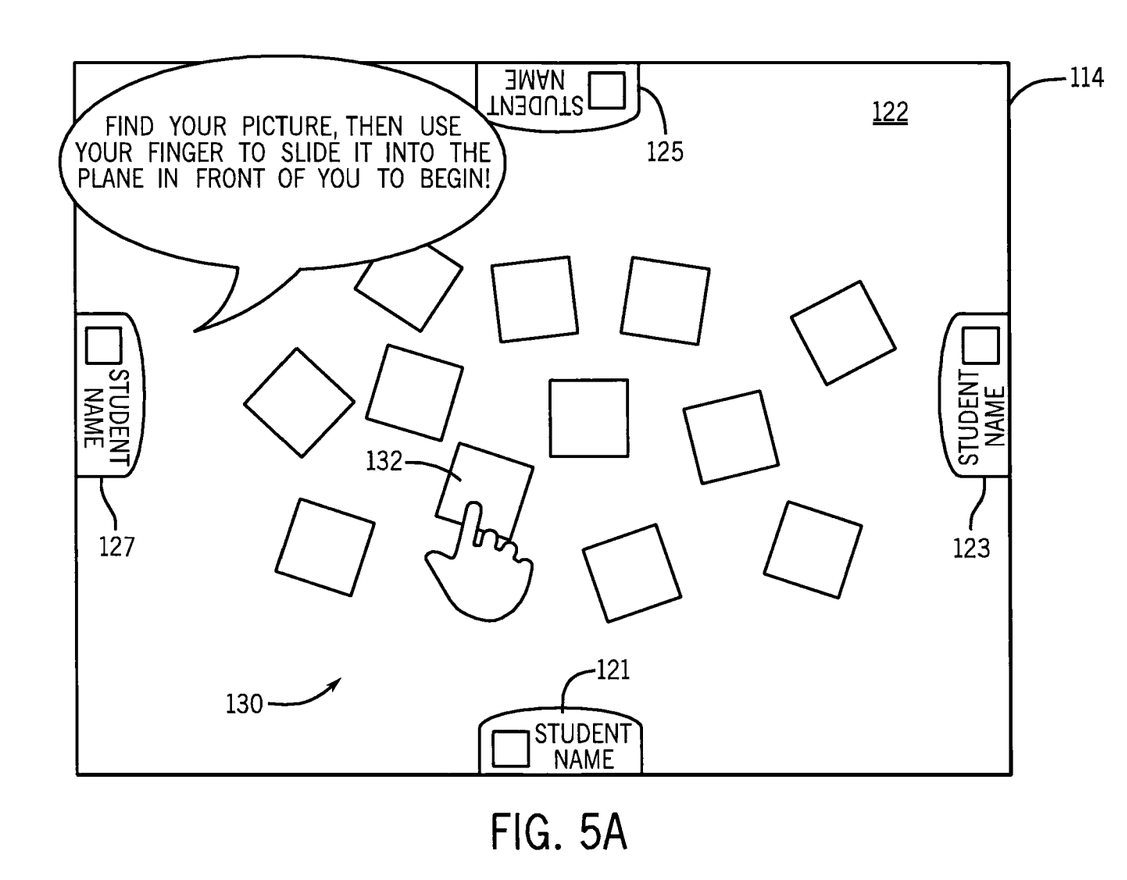
FIG. 5A is a front view of a display of the system of FIG. 4 showing a plurality of pictures and a first user selecting a first picture as part of a first authentication step for the first user.
Figure 5B:
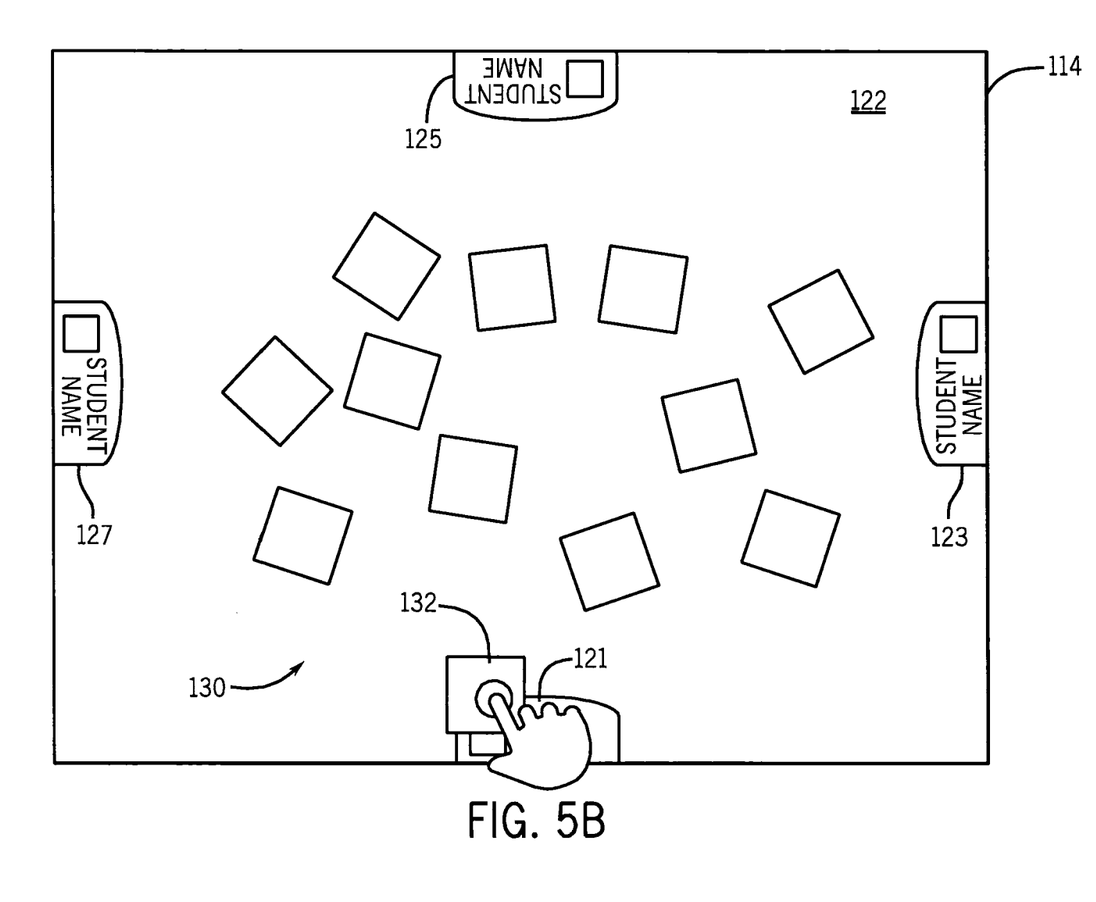
FIG. 5B is a front view of the display of FIG. 5A showing a first user dragging the first picture as part of a second authentication step for the first user.
Figure 5C:
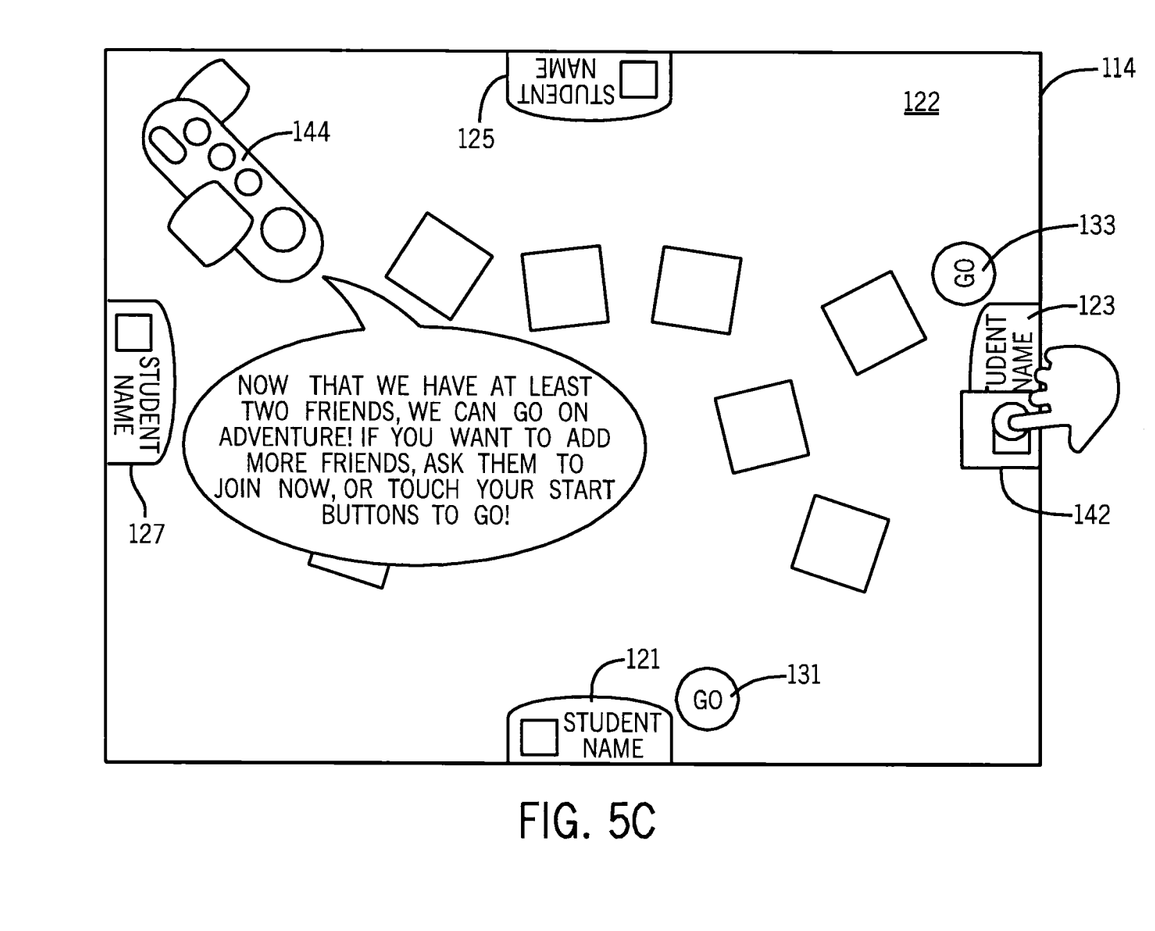
FIG. 5C is a front view of the display of FIG. 5B showing a second user selecting a second picture from the plurality of pictures as part of a first authentication step for the second user and dragging the same picture as part of a second authentication step for the second user.

As shown in FIGS. 5A-5C, the display 114 can include four planes 121, 123, 125, 127, each plane comprising a separate window on the screen 122 of the display 114. It is contemplated, however, that a system 110 according to the invention is not limited to only four planes, but can include two, three, five, or more planes.

Figure 6:
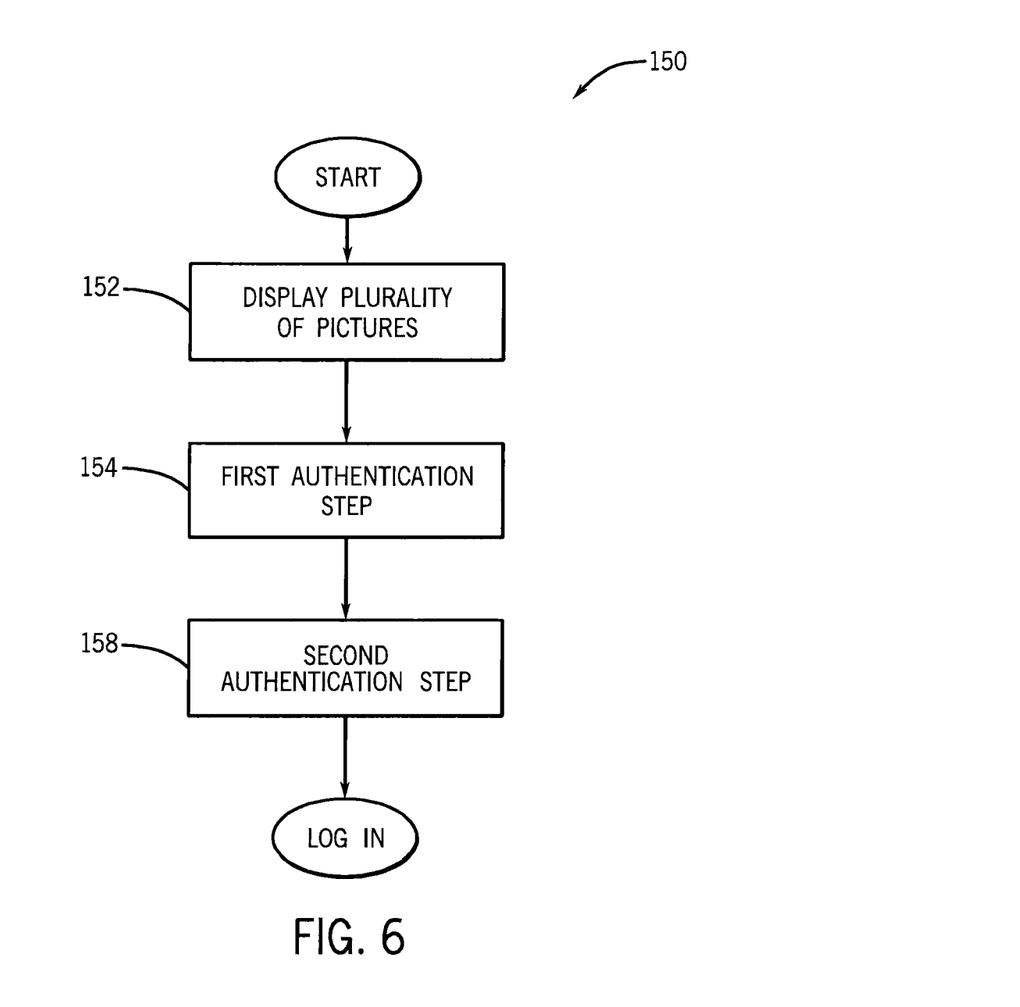
FIG. 6 is a flowchart showing a method for logging a user in to their corresponding user account.

The system 110 allows multiple users to log into their corresponding user accounts by the method 150 shown in FIG. 6 and described below. A first student activates the system 110 to start the method 150. In a first step 152, the system 110 retrieves a plurality of pictures 130 from the memory storage device 126 and displays the plurality of pictures 130 on the display 114. As shown in FIG. 5A, the plurality of pictures 130 can be displayed on the screen 122 of the display 14 in a random fashion so that users from all different sides of the system 110 can view the pictures 130. The plurality of pictures 130 may include a picture of each user of a group, such as a class. As shown in FIG. 5A, the processor 112 is configured to receive an input from the first student to select a first picture 132 that corresponds to himself or herself in a first authentication step 154. The user may select the picture 132 in this first authentication step 154 by touching the touch-screen 122 on the display 114 in the area of the screen 122 where the picture 132 is located.

After selecting the first picture 132 that corresponds to the user in the first authentication step 154, the first user can then drag the first picture 132 to the first plane 121 of the display 114 in a second authentication step 158 for the first user. In doing so, the system 110 can associate the first user with the first plane 121. This step 158 is shown in FIG. 5B.

A second user can begin to log into the system 110 using the same method 150 as the first user. The processor can be programmed to receive an input from the second user to allow the second user to select a second picture 142 corresponding to the second user from the plurality of pictures 130 to provide a first authentication step 152 for the second user. As shown in FIG. 5C, the second user can drag the second picture 142 selected from the plurality of pictures 130 to the second plane 123 of the display 114 to provide a second authentication step 158 for the second user and associate the second user with the second plane 123.

The processor 112 can log the first user into the corresponding user account for the first user in the first plane 121 after the first user drags the first picture 132 into the first plane of the display 114 in the second authentication step 158 for the first user. Similarly, the processor 112 can log the second user into the corresponding user account for the second user in the second plane 123 after the second user drags the second picture 142 into the second plane 123 of the display 114 in the second authentication step 158 for the second user.

Having a first authentication step 154 and a second authentication step 158 allows the users an opportunity to release a picture selected in the first authentication step 154 that does not correspond to the user. In the system 110 shown in FIGS. 4 and 5A-5C. the user can release pressure on the touch screen 122 of the display 114 above the area where the picture was selected. Then, the user can select the appropriate picture and drag the picture into a plane 121, 123, 125, 127 nearest the user. Thus, having a first authentication step 154 and a second authentication step 158 reduces the likelihood a user will accidentally log into another user's user account.

As shown in FIG. 5C, the system 110 can also include start buttons 131, 133 that appear near the planes 121, 123, respectively, where a user has selected a picture 132, 142 in the first authentication step 154 and dragged the picture 132, 142 to a plane 121, 123. The start buttons 131, 133 allow the first and second user to bypass the initial log-in screen that includes the plurality of pictures 130 while the system 110 waits to determine if another user is going to log into the system 110. Thus, if the first and second users are the only members of the group that are going to log into the system 110, the users can engage the start buttons 131, 133 after completing the first authentication step 154 and the second authentication step 158 to log into the system 110. Alternatively, the processor 112 can be programmed to wait for a specified period of time of inactivity and then log the first and second users into the system 110 without the engagement of start buttons 131, 133.

Similar to system 10 described above, the multi-user log-in system 110 and method 150 can include prompts with audible instructions to assist the users to log into their corresponding user accounts. For example, an audible instruction, as shown in FIG. 5A, may state: "Find YOUR picture, then use your finger to slide it into the plane in front of you to begin!" This audible instruction may occur while the plurality of pictures 130 are displayed on the screen 122 during step 152. The audible instruction may also be associated with an animated figure 144, such as the animated figure 144 shown in FIG. 5C.

Once the first and second users are logged into their corresponding user accounts, the users may execute an application, such as those found in the Shell Squad Games package described above. Even though each user may execute the application together in a team environment, each user is logged into their corresponding user account and the system 110 may compile data of the users' progress on certain applications and save that data to the corresponding user account on the memory storage device 126. This allows an administrator to access the plurality of user accounts on the memory storage device 126 to view information providing each user's habits and progress on the applications on the system 110.

System 110 may also contain a similar verification feature as described above for system 10. During the time the first user is logged into the first plane 121, the first user's picture 132 can be displayed on the display 114, preferably near the plane 121. In addition, while the second user is logged into the second plane 123, the second user's picture 142 can be displayed on the display 114, preferably near the plane 123. As previously described, this feature allows the teacher to verify that the students using the system 110 match the pictures 132, 142 shown on the display 114 that correspond to those students' user accounts.

Although the multi-user system 110 and method 150 was described for two users, the system 110 and method 150 may be used for only one user or for three or more users.

It should be understood that the methods and apparatuses described above are only exemplary and do not limit the scope of the invention, and that various modifications could be made by those skilled in the art that would fall under the scope of the invention. For example, it will be readily apparent that the various methods described herein may be implemented by, e.g., appropriately programmed general purpose computers and computing devices including mobile devices. Typically a processor (e.g., a microprocessor) will receive instructions from a memory or like device, and execute those instructions, thereby performing a process defined by those instructions. The instructions may be programmed in any of a plurality of programming languages including, but not limited to, Java, Java Visual Basic, C, C#, or C++, Fortran, Pascal, Eiffel, Basic, COBOL, etc. or any of a variety of combinations thereof. The computer-readable medium on which such instructions are stored may reside on one or more of the components of a general-purpose computer or mobile devices described above, and may be distributed across one or more components. Further, programs that implement such methods and algorithms may be stored and transmitted using a variety of known media. It should be apparent to those skilled in the art that the present invention is not limited to a specific programming language, computer system, distributed architecture, network, or communication protocol.

The term "memory storage device" as used herein refers to any medium that participates in providing data (e.g. instructions) which may be read by a computer, a processor or a like device. Such a medium may take many forms, including but not limited to, non-volatile media, volatile media, and transmission media. Volatile media include dynamic random access media (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EEPROM, any other memory chip or cartridge, a carrier wave, or any other medium from which a computer can read.

Various forms of memory storage devices may be involved in carrying sequences of instructions to a processor. For example, sequences of instruction (i) may be delivered from RAM to a processor, (ii) may be carried over a wireless transmission media, and/or (iii) may be formatted according to numerous formats, standards or protocols, such as Bluetooth, TDMA, CDMA, and 3G.

Where databases are described, it will be understood by one of ordinary skill in the art that (i) alternative database structures to those described may be readily employed, (ii) other memory structures besides databases may be readily employed.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Thus, the invention is to cover all modifications, equivalents, and alternatives falling within the spirit and scope of the invention as defined by the following appended claims. To apprise the public of the scope of this invention, the following claims are made.

The invention claimed is:

1. A system for logging a user into a corresponding user account from a plurality of user accounts, the user being one member of a group, the system comprising:
   a processor;
   a user interface in communication with the processor; and
   a display in communication with the processor, wherein the processor is programmed to:

display a first plurality of pictures, the first plurality of pictures including pictures depicting of each member of the group;

receive a first input from the user interface selecting a first picture depicting the user and corresponding to the user from the first plurality of pictures to provide a first identification step;

display the first picture depicting the user and corresponding to the user after the first identification step;

receive a second input from the user interface selecting an identifying picture depicting the user to provide a second identification step;

compare the first picture depicting the user to the identifying picture depicting the user to authenticate an identity of the user;

log the user into the corresponding user account if a result of the comparison of the first picture depicting the user to the identifying picture depicting the user indicates that the first picture depicting the user is identical to the identifying picture depicting the user and wherein the first input and the second input are not previously established by the user.

2. The system of claim 1, wherein the first picture depicting the user selected from the first identification step is displayed on the display while the user is logged into the corresponding user account.

3. The system of claim 1, wherein the processor is further programmed to:

direct the user back to the first identification step if the first input selecting the first picture depicting the user and corresponding to the user does not correspond to the second input selecting the identifying picture.

4. The system of claim 1, wherein the processor is further programmed to:

display a second plurality of pictures after the first identification step, the second plurality of pictures including the first picture depicting the user and corresponding to the user selected in the first identification step.

5. The system of claim 4, wherein the second plurality of pictures includes at least one other picture from the first plurality of pictures, a total number of pictures in the second plurality of pictures being less than a total number of pictures in the first plurality of pictures.

6. The system of claim 1, wherein the processor is further programmed to:

prompt the user to select the first picture depicting the user from the first plurality of pictures by providing a first audible instruction to the user, the first audible instruction being associated with an animated figure.

7. The system of claim 1, wherein the processor is further programmed to:

prompt the user in the second identification step to select the identifying picture depicting the user by providing a second audible instruction to the user.

8. The system of claim 1, wherein the user interface comprises at least one of a mouse, a keyboard, a touch-screen, and a controller.

9. The system of claim 1, further comprising:

a memory storage device for storing a database that includes the plurality of user accounts, each user account of the plurality of user accounts including personal identification data corresponding to a member of the group; and a camera in communication with the processor and configured to acquire a picture of each user, the processor configured to store each picture of each user with the corresponding user account in the database.

10. The system of claim 9, wherein the processor is remotely connected to the memory storage device.

11. The system of claim 9, wherein the processor, the user interface, and the display comprise at least one of a personal computer and a mobile device.

12. A method for logging a user into a corresponding user account on at least one of a computer and mobile device including a user interface, the user being one member of a group, the method comprising the steps of:

displaying a first plurality of pictures on a display, the first plurality of pictures including a pictures depicting of each member of the group;

providing a first identification step by configuring the user interface to allow the user to provide a first input by selecting a first picture depicting the user and corresponding to the user from the first plurality of pictures;

displaying the first picture depicting the user and corresponding to the user after the first identification step;

providing a second identification step by configuring the user interface to allow the user to provide a second input to confirm an identity of the user by selecting an identifying picture depicting the user;

logging the user into the corresponding user account if the first input selecting the first picture depicting the user and corresponding to the user in the first identification step is identical to the second input selecting the identifying picture depicting the user and wherein the first input and the second input are not previously established by the user.

13. The method of claim 12, wherein the first picture depicting the user and corresponding to the user selected from the first identification step and the identifying picture depicting the user selected from the second identification step are displayed on the computer while the user is logged into the corresponding user account.

14. The method of claim 12, wherein the step of displaying the first picture depicting the user and corresponding to the user after the first identification step includes displaying a second plurality of pictures, the second plurality of pictures including the first picture depicting the user selected from the first identification step and at least one other picture from the first plurality of pictures, a total number of pictures in the second plurality of pictures being less than a total number of pictures in the first plurality of pictures.

15. The system of claim 1, wherein the group includes members that are non-readers.

16. The system of claim 1, wherein the processor is further programmed to:

monitor progress of each member of the group during execution of at least one computer application provided by the processor, the at least one computer application configured to provide each member of the group an instruction on at least one of a specific lesson and a skill set; and provide feedback of the monitored progress of each member of the group to at least one of a teacher, an instructor and a parent, wherein the user account of each member of the group is individualized to allow access to the at least one computer application based on the monitored progress and provided feedback.

17. A system for logging multiple users into corresponding user accounts from a plurality of user accounts, the multiple users including at least a first user and a second user, the first user and the second user being members of a group, the system comprising:
- a processor;
- a user interface in communication with the processor; and
- a display in communication with the processor;
- wherein the processor is programmed to:
  - display a plurality of pictures, the plurality of pictures including a pictures depicting of each member of the group;
  - receive input from the user interface to allow the first user to select a first picture depicting the user and corresponding to the first user from the plurality of pictures to provide a first identification step for the first user, and to allow the second user to select a second picture depicting the user and corresponding to the second user from the plurality of pictures to provide a first identification step for the second user;
  - log the first user into a first corresponding user account for the first user after the first user performs a second identification step for the first user;
  - log the second user into a second corresponding user account for the second user after the second user performs a second identification step for the second user; and
  - wherein the input received from the user interface is not previously established by the first user and the second user.

18. The system of claim 17, wherein the second identification step for the first user allows the first user to drag the first picture depicting the user selected from the plurality of pictures to a first plane of the display, and the second identification step for the second user allows the second user to drag the second picture depicting the user selected from the plurality of pictures to a second plane of the display, wherein the first plane and second plane comprising separate windows on the display.

19. The system of claim 18, wherein the first picture depicting the user selected from the plurality of pictures and dragged to the first plane is displayed on the first plane of the display while the first user is logged into the first corresponding user account for the first user in the first plane and the second picture depicting the user selected from the plurality of pictures and dragged to the second plane is displayed on the second plane of the display while the second user is logged into the second corresponding user account for the second user in the second plane.

20. The system of claim 17, wherein the processor is further programmed to:
- monitor progress of each member of the group during execution of at least one computer application provided by the processor, the at least one computer application configured to provide each member of the group an instruction on at least one of a specific lesson and a skill set; and
- provide feedback of the monitored progress of each member of the group to at least one of a teacher, an instructor and a parent,
- wherein the user account of each member of the group is individualized to allow access to the at least one computer application based on the monitored progress and provided feedback.

21. The system of claim 17, wherein the processor is further programmed to simultaneously log the first user into the first corresponding user account and log the second user into the second corresponding user account.

\* \* \* \* \*